(12) United States Patent
Van Vooren

(10) Patent No.: US 6,988,352 B2
(45) Date of Patent: Jan. 24, 2006

(54) ACCELERATOR AND CROP PROCESSOR MOVEMENT

(75) Inventor: Sandor W. Van Vooren, Sijsele-Damme (BE)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 11/112,592

(22) Filed: Apr. 22, 2005

(65) Prior Publication Data

US 2005/0262820 A1 Dec. 1, 2005

(30) Foreign Application Priority Data

May 27, 2004 (GB) .................................... 0411826

(51) Int. Cl.
*A01D 61/00* (2006.01)

(52) U.S. Cl. .................................................. 56/16.4 R

(58) Field of Classification Search ............ 56/16.4 A, 56/16.4 B, 16.4 R, 16.6, 153, DIG. 1, DIG. 9; 241/101.01, 101.02, 101.74

See application file for complete search history.

(56) References Cited

U.S. PATENT DOCUMENTS

| | | | | |
|---|---|---|---|---|
| 4,696,432 A | * | 9/1987 | Russ et al. | ............ 241/101.742 |
| 4,747,260 A | * | 5/1988 | Petrasch et al. | ............... 56/505 |
| 5,822,962 A | * | 10/1998 | Wagstaff et al. | ......... 56/16.4 R |
| 5,863,005 A | * | 1/1999 | Bramstedt et al. | .... 241/101.742 |

FOREIGN PATENT DOCUMENTS

| | | |
|---|---|---|
| EP | 1229778 B1 | 8/2002 |
| EP | 1358788 A2 | 11/2003 |
| GB | 20040011826 | 5/2004 |

* cited by examiner

*Primary Examiner*—Meredith C. Petravick
*Assistant Examiner*—Alicia Torres
(74) *Attorney, Agent, or Firm*—John William Stader

(57) ABSTRACT

In a forage harvester having a cutter for chopping gathered crop material, a unit is arranged downstream of the cutter, the unit including an accelerator arranged in the path of crop flow for propelling the crop towards a discharge spout, and a crop processor for cracking kernels which is selectively movable into and out of the crop flow path at a location between the cutter and the accelerator. The accelerator comprises a rotor and housing which are together movable towards the cutter when the crop processor is withdrawn from the crop flow path.

8 Claims, 6 Drawing Sheets

PRIOR ART

PRIOR ART

ACCELERATOR AND CROP PROCESSOR MOVEMENT

CROSS REFERENCE TO RELATED PATENT APPLICATIONS

This Patent Application claims priority under 35 U.S.C. § 119 to GB0411826.1, filed on May 27, 2004 titled, "Accelerator and Crop Processor Movement", the full disclosure of which is hereby fully incorporated herein by reference.

FIELD OF THE INVENTION

This invention relates to forage harvesters.

BACKROUND OF THE INVENTION

Forage harvesters are machines which chop crop gathered from a field into small pieces to produce animal feed. In the case of crops such as grass or alfalfa, these will have been pre-cut and left to dry in the sun, so that the crop need only be gathered by the harvester. With other crops, such as maize, the forage harvester may also be required to cut the crop. Thus, the harvesters may be fitted with different headers to suit the crop being harvested.

The crop, whether cut maize or gathered grass, is fed into a rotating knife drum or cutter which comminutes the product. With grass crops, this alone is sufficient to produce the desired forage. However, when harvesting maize for silage purposes, the cutting alone does not suffice due to the presence of kernels in the crop. The kernels need to be cracked in order to release the nutrient, as uncracked kernels are hard for animals to digest. As cutting alone is insufficient to crack all the kernels, the crop is additionally passed through a crop processor which comprises two closely adjacent rollers, typically having serrated surfaces, which rotate such that there is slippage between the adjacent surfaces. The gap between the rollers is set to suit the size of grain passing through and the speed, rotational energy of the rollers, relative movement and serration of the surfaces together ensure cracking of any kernels that are still intact after chopping by the cutter.

The momentum of the maize from the crop processor or the grass from the cutter, as the case may be, carries the crop into an accelerator or blower which then propels it up a tower to a discharge spout through which it is discharged into a wagon or a trailer drawn by a separate vehicle driven alongside the harvester. When chopping kernel-free crops, such as grass or alfalfa, the crop processor is not required and leaving it in place in the crop flow path results in its rollers being unnecessarily subjected to wear.

To avoid such wear, it has previously been proposed to remove the crop processor from the vehicle, but the size and weight of the crop processor make this a difficult and cumbersome task.

Another solution that has been proposed is simply to pivot the crop processor away from the crop path but to leave it on the vehicle. In this case, it was found that the crop does not have sufficient momentum when discharged from the cutter to cross the space normally occupied by the crop processor and reach the accelerator, resulting in a tendency to develop a blockage between the cutter and the accelerator.

EP 1 229 778 addresses the above problem by moving the accelerator towards the cutter when the crop processor is withdrawn. This is achieved by pivoting the crop processor and accelerator together relative to the outlet of the cutter between two positions. In one position, the crop passes through the crop processor before reaching the accelerator and in the other position, intended for grass type crops, the crop processor is pivoted out the crop path and the accelerator is moved towards the cutter.

However, the mechanism described in EP 1 229 778 itself suffers from certain disadvantages in that there is a tendency for crop to create a blockage upstream of the accelerator when the latter is moved into its position nearer the cutter.

SUMMARY OF THE INVENTION

With a view to mitigating the foregoing disadvantage, there is provided, in accordance with a first aspect of the present invention, a forage harvester comprising a cutter operable to comminute crop material and a unit arranged downstream of the cutter, the cutter including an accelerator arranged in the path of crop flow for propelling the crop towards a discharge spout, and a crop processor for cracking kernels, the crop processor being selectively movable into and out of the crop flow path at a location between the cutter and the accelerator, wherein the accelerator comprises a rotor and housing which are together movable towards the cutter when the crop processor is withdrawn from the crop flow path.

The present invention differs from EP 1 229 778 in that the latter maintains the housing of the accelerator stationary while moving only its rotor. Thus, the accelerator housing confining the crop material and guiding it towards the discharge spout remains in the same position regardless of the position of the rotor of the accelerator. By contrast, in the present invention, the housing of the accelerator moves with the rotor, which avoids any risk of a blockage developing within the housing of the accelerator.

According to a second aspect of the invention, there is provided a method for optimizing the operation of a forage harvester, wherein the forage harvester comprises a cutter operable to comminute crop material and a unit arranged downstream of the cutter, the unit including an accelerator comprising a rotor and a housing arranged in the path of crop flow for propelling the crop towards a discharge spout, and a crop processor for cracking kernels, the crop processor being selectively moveable into and out of the crop flow path at a location between the cutter and the accelerator, the method comprising the steps of moving the accelerator towards the cutter, simultaneously withdrawing the crop processor from the crop flow path, and filling the formed gap between the exit of the accelerator and an intake end of the discharge spout with a retractable section of conduit.

If the discharge spout remains stationary a gap is formed between the exit of the accelerator and an intake end of the discharge spout when the accelerator is moved towards the cutter. In an embodiment of the invention, a retractable section of conduit is provided to occupy this gap and guide the crop from the accelerator into the discharge spout.

The retractable conduit is most simply made to be entirely removable from the crop flow path and, when deployed, is held captive in sealed relationship between the accelerator and the discharge spout.

In a preferred embodiment of the invention, the housing of the accelerator and the crop processor are supported on a common rigid frame that is pivotable relative to the flow path to allow the crop processor to swing in and out of the flow path of the crop.

Advantageously, the housing of the accelerator is further supported relative to a frame of the harvester by a secondary arm creating a parallelogram linkage so that the orientation of the accelerator housing relative to the cutter and the discharge spout remains constant as the crop processor swings in and out of the flow path of the crop.

BRIEF DESCRIPTION OF THE FIGURES

The invention will now be described further by way of example with reference to the accompanying drawings in which.

DETAILED DESCRIPTION OF THE PREFERRED EMBODIMENTS

Figure 1:
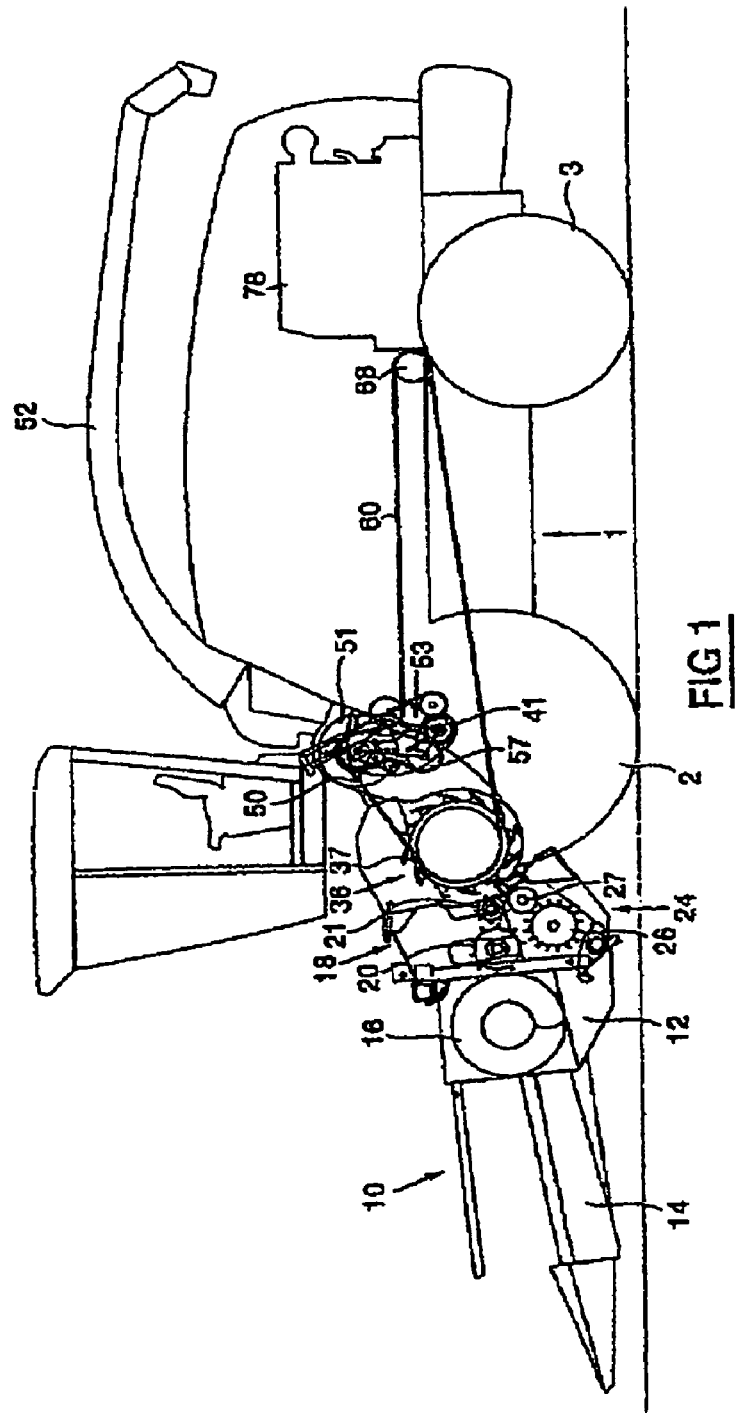
FIG. 1 is a side elevational view of a prior art forage harvester, comprising a front unit, mounted to a main frame, and a crop processing apparatus.

FIGS. 1 to 5 represent a prior art forage harvester as described in EP 1 229 778 which will be described herein for a better understanding of the problem solved by the present invention. In the description below, The terms "front", "rear", "forward", "rearward", "right" and "left" are determined with respect to the normal direction of movement of the harvester in operation and are not to be construed as limiting terms.

FIGS. 1 to 5 show a forage harvester having a main frame 1 on which are mounted ground engaging traction wheels 2 and steering wheels 3. The forage harvester is shown equipped with a crop collecting apparatus, in the form of a row crop attachment 10, suitable for the harvesting of maize. This attachment can be replaced with a conventional windrow pick-up device or a conventional cutter bar attachment, depending on the type of crop to be harvested. Customarily, the row crop attachment 10 comprises an attachment frame 12, which supports a plurality of row crop units 14, operable to harvest maize stalks from the field and to convey the crop rearwardly to a transverse auger 16. This in turn delivers the crop material to the bite of a feeder installed in a front unit of the forage harvester.

The feeder comprises a forward lower feed roll 26, a smooth rear lower feed roll 27, an upper forward feed roll 20 and an upper rear feed roll 21. The lower feed rolls 26, 27 are rotatably mounted in a lower feeder frame 24 and the upper feed rolls 20, 21 are mounted in an upper feeder frame 18, to which the row crop attachment 10 is secured. The feeder rolls rotate to convey the crop material between them to a cutter 36, which comprises a plurality of knives 37, generating a cylindrical peripheral shape or profile, when the cutter 36 is rotated.

The knives 37 co-operate with a fixed shear bar to cut the crop material to length. A crop processor 41 is provided comprising a set of counter-rotating compressor rollers 57 which crack the kernels that are left in the chopped material. The compressor rollers 57 may have a serrated or fluted surface.

The crop processor 41 and an accelerator rotor 51 are movable as a functional unit between a first position and a second position as will be described below with reference to FIGS. 2 to 5. In a first position the cutter 36 projects the cut material into the bite of the crop processor 41. This delivers the crushed maize kernels to the accelerator rotor 51 which is installed within an accelerator housing. The accelerator rotor 51 comprises a plurality of paddles 50, which throw the material upwardly through the accelerator outlet into a discharge spout 52, which can be positioned by an operator to direct the cut crop material as required, normally into a wagon which is moving alongside or behind the forage harvester. In a second position the crop processor 41 is moved out of the path of the comminuted crop stream and the accelerator rotor 51 is lowered to take its place so that the comminuted material from the cutter 36 is thrown directly into the accelerator rotor 51 and from there into the discharge spout.

The power to drive the forage harvester is delivered by an engine 78. The engine also drives a pulley 68 which is connected by a belt 60 to provide power to the cutter 36, the crop processor 41 and the accelerator rotor 51.

Figure 2:
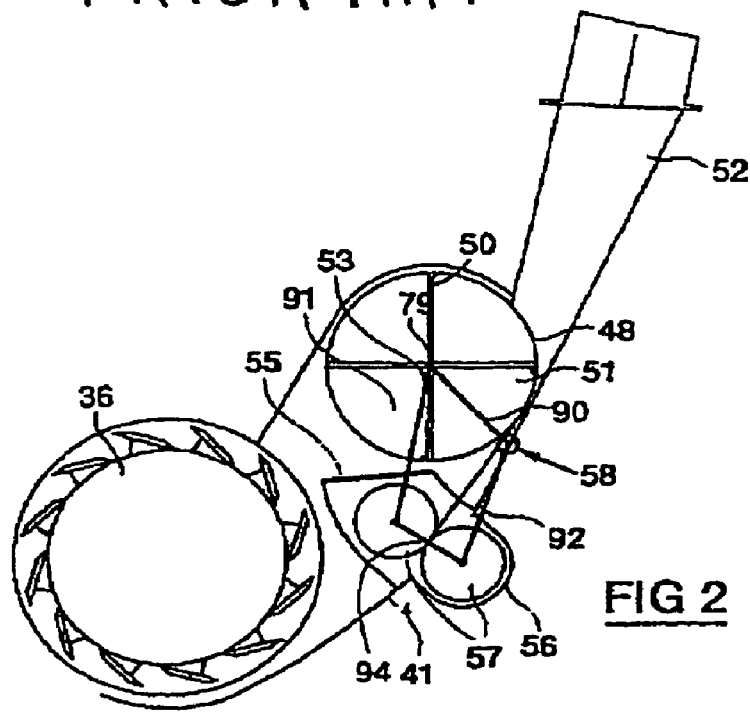
FIG. 2 is a schematic side view of a detail of the forage harvester of FIG. 1, with the crop processor positioned in the crop flow path between the cutter and the accelerator.
Figure 3:
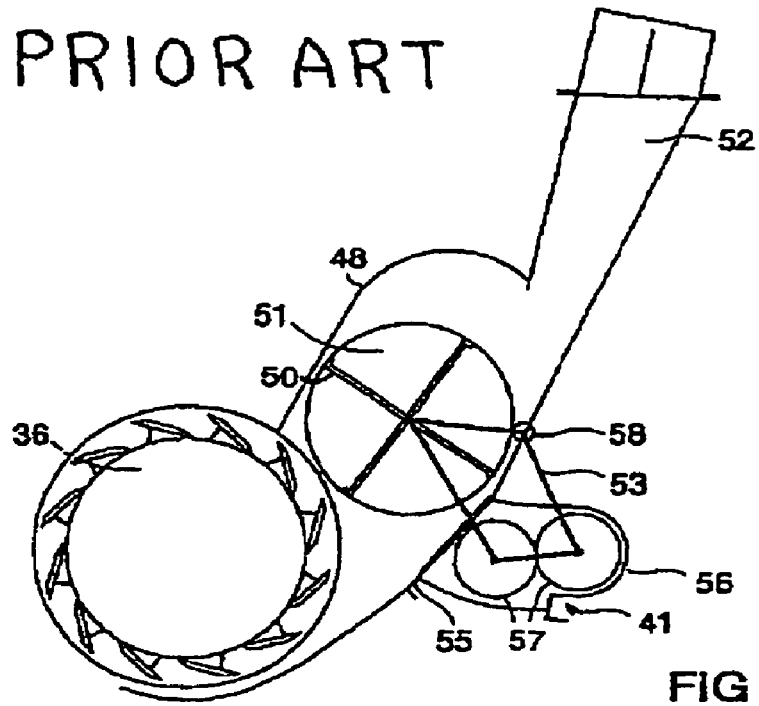
FIG. 3 is a similar side view to FIG. 2 showing the crop processor withdrawn from the crop flow path and the accelerator rotor displaced towards the cutter.

In EP 1 229 778, the accelerator 51 and crop processor 41 are assembled into one unit, all being attached to a frame 53, represented schematically in FIGS. 2 and 3, that pivots around a pair of mutually opposed stub shafts 58, which are journalled in the main frame 1. The space between the stub shafts 58 allows passage of the crop material. When using the crop processor, the accelerator and crop processor are positioned as in FIG. 2. When the crop processor function is not needed, the whole accelerator/crop processor assembly is pivoted around the stub shafts 58 until it reaches the position illustrated in FIG. 3. By doing this, the accelerator is moved very close to the cutter 36, thus minimizing the distance between cutter and accelerator and as a consequence, avoiding possible crop blockage in the channel between cutter and the accelerator. Frame 53 also contains two guide plates 55 and 56, which automatically close the transport channel between the cutter and the accelerator in both positions.

The frame 53, which is moved by a hydraulic cylinder (not shown), comprises a pair of struts 90 arranged on both sides of the accelerator housing 48 and connected to the pivot shafts 58. The upper ends of the struts 90 are interconnected by a transverse beam 91. The accelerator axle 79 is supported in a pair of bearing blocks fixed to the front faces of the struts 90. The transverse beam 91 provides the necessary structural rigidity to the frame 53. This frame 53 further comprises a second transverse beam 94 interconnecting the struts 90 below stub shafts 58 and a pair of downwardly extending struts 92, which are connected to the struts 90 adjacent stub shafts 58. The processor rolls 57 are journalled in a pair of bearing plates 93, which are connected to the upward and downward struts 90, 92. The plates are arranged on both sides of the accelerator housing 48 and also carry the journals of an idler roller 64. The bearing plates are removably connected, e.g. by bolts, to the struts 90, 92. This allows complete removal of the crop processor 41 after the maize season, such that no power has to be provided to rotate the crop processor rollers 57. In the normal working condition the frame 53 is constituted by the struts 90, 92, the transverse beams 91, 94 and the bearing plates 93.

When the crop processor rollers 57 are in the upper crop-engaging position (FIGS. 2 and 4), the comminuted crop material from the cutter 36 is led to the bite of the compressor rollers 57 by a horizontal part of the lower guide plate 56, which is attached to the frame 53. The second guide plate 55 is in an upward position free of the crop material trajectory. Second guide plate 55 is also attached to frame 53. When the crop processor rolls 57 are in the lower non-engaging position (FIGS. 3 and 5), second guide plate 55 is positioned to block any aperture in the duct between the cutter 36 and the accelerator 51, thus guiding the comminuted crop material from the cutter 36 to the accelerator 51.

Figure 4:
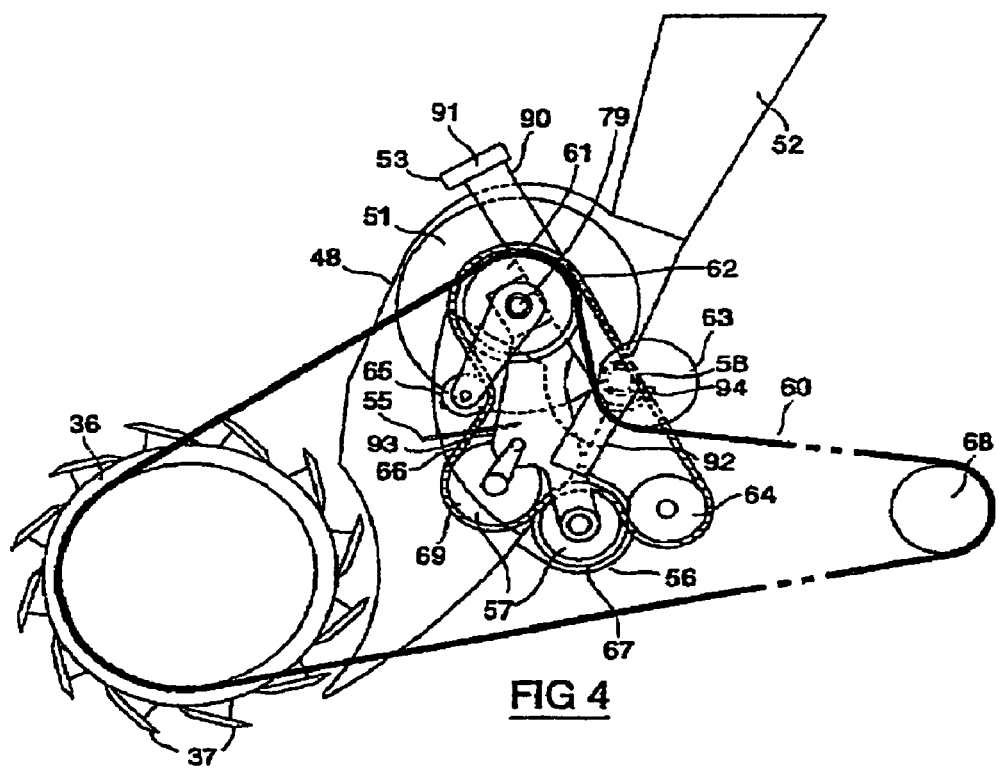
FIG. 4 is a side view of the prior art harvester showing the arrangement of the drive belts for the cutter, the crop processor and the accelerator in the configuration shown in FIG. 2.
Figure 5:
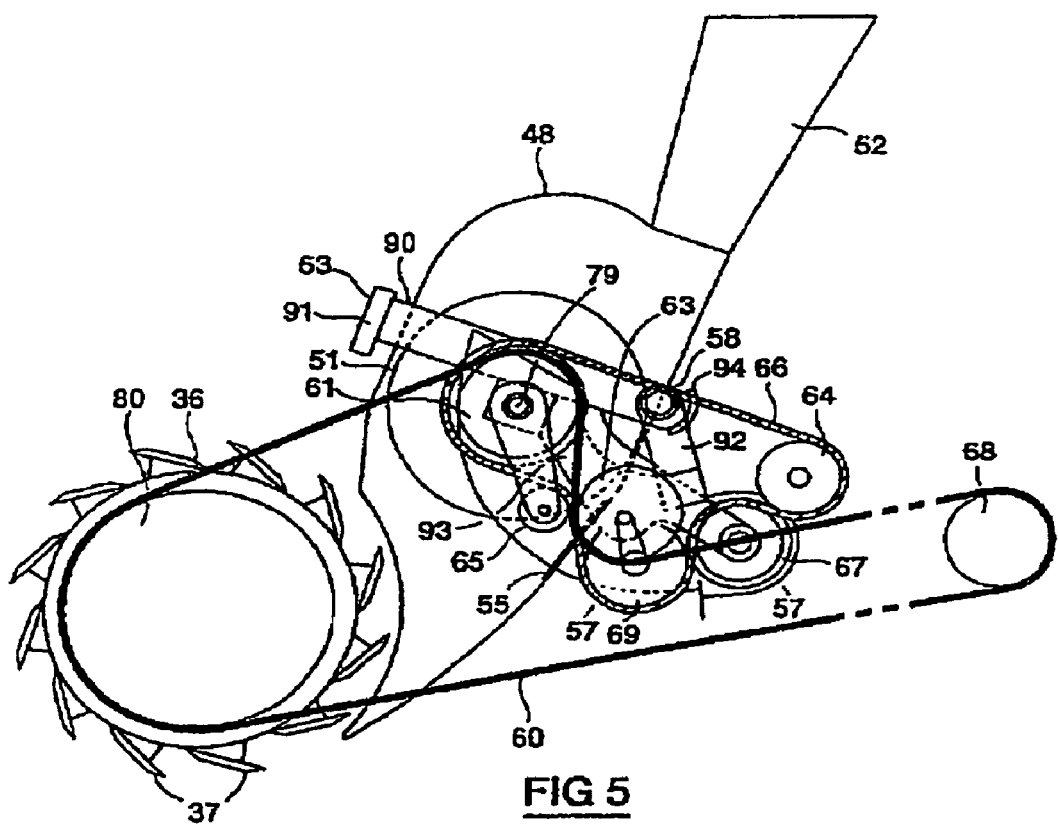
FIG. 5 is a side view of the prior art harvester showing the arrangement of the drive belts for the cutter, the crop processor and the accelerator in the configuration shown in FIG. 3.

As shown in FIGS. 4 and 5, the pulley system 62, 63, 64, 65, 66 67, 69 moves en bloc as the frame 53 is rotated about the pivot shafts 58 to bring the crop processor rolls 57 out of the crop path.

The problem encountered in the prior art forage harvester of FIGS. 1 to 5 is most readily appreciated from a study of FIG. 3. The space between the rotor 51 of the accelerator and its housing 48 will develop blockages during operation. As the housing 48 does not move, it must be shaped to accommodate the accelerator rotor 51 when it is in the position shown in FIG. 2 and the space above the rotor 51 in FIG. 3 is therefore unavoidable.

Figure 6:
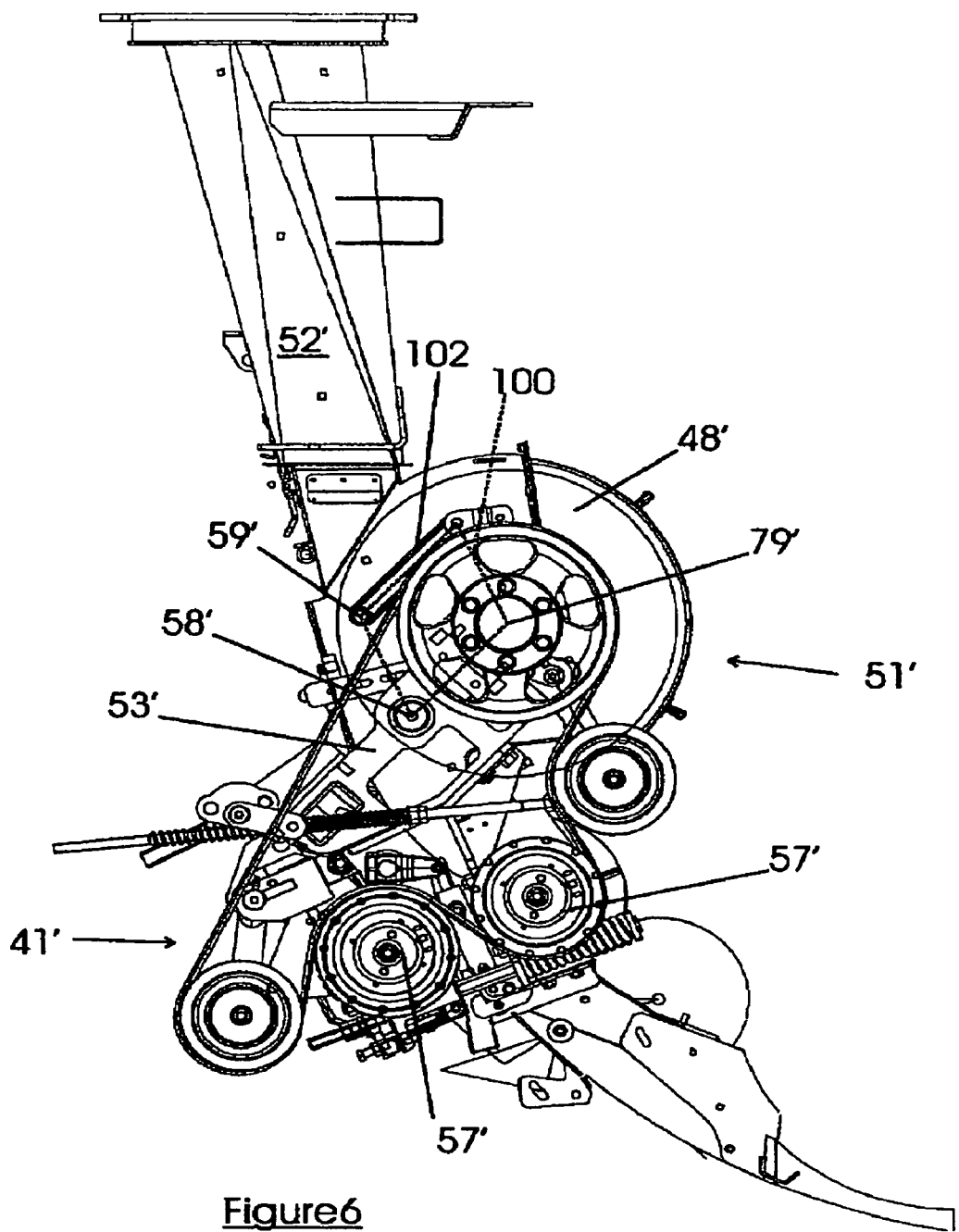
FIG. 6 is a more detailed side view analogous to FIG. 2, showing an embodiment of the present invention.
Figure 7:
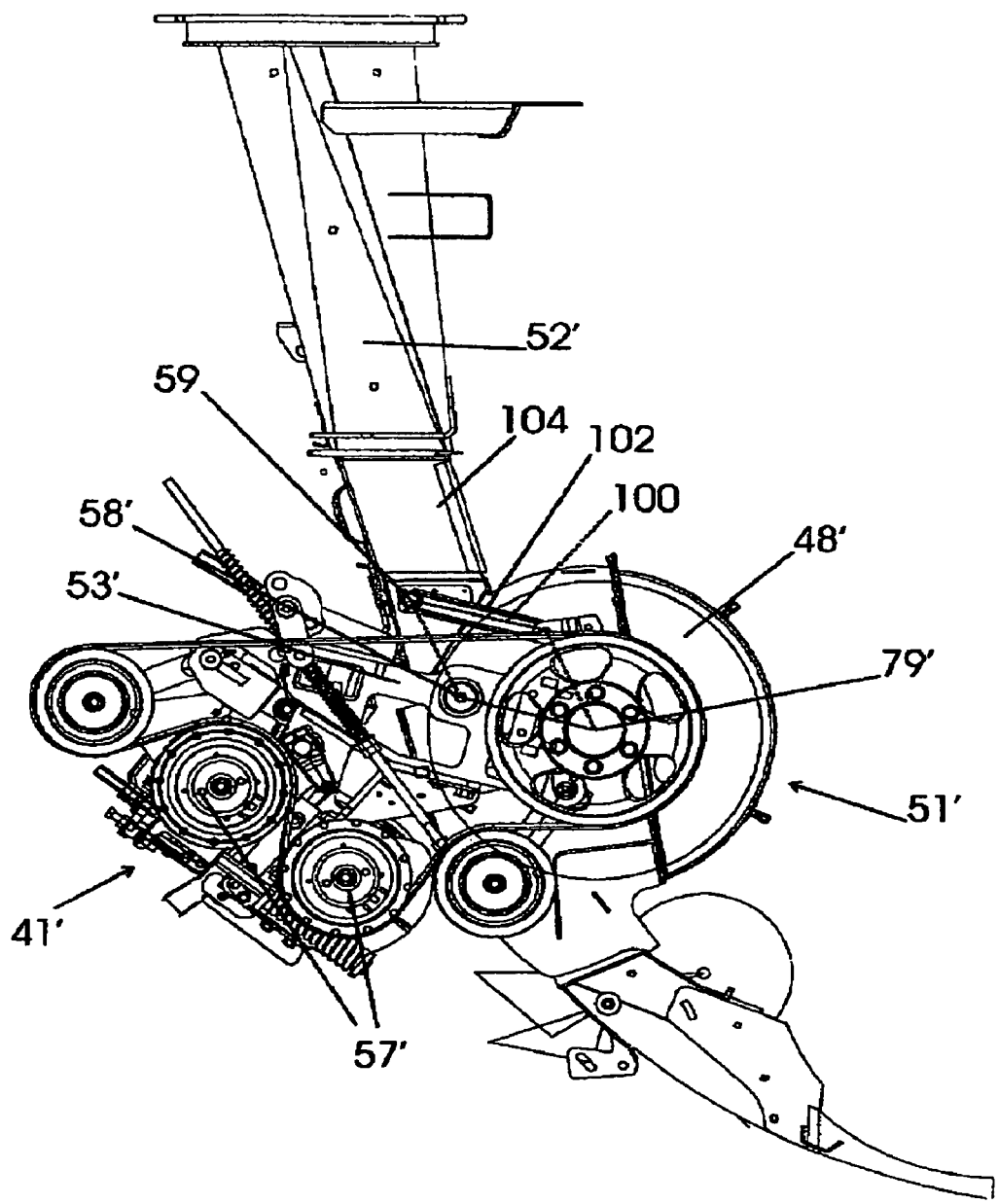
FIG. 7 is a detailed side view, analogous to FIG. 3, of the embodiment of the present invention shown in FIG. 6.

In the embodiment of the invention shown in FIGS. 6 and 7, to avoid unnecessary repetition, analogous components to those already described have been allocated like reference numerals but a prime has been added to the numerals.

By comparing FIG. 6 with FIG. 7, it will be seen that the invention avoids the problem of blockage downstream of the accelerator rotor 51' by moving the entire accelerator housing 48' relative to the discharge spout 52' and the cutter (not shown). Thus, the accelerator 51' need not move within the accelerator housing 48' so that blockages are no longer an issue.

While a pivoting frame 53' is still used to move the accelerator rotor 51' in unison with the crop processor 41', the frame 53' cannot be rigidly connected to the housing 48' of the accelerator as the housing 48' would then be misaligned with the crop flow path when the accelerator is in one or other of its end positions. It is therefore necessary to take steps to maintain the correct orientation of the housing 48' as it is raised and lowered relative to the cutter.

In the illustrated embodiments, the housing 48' is connected to the frame by means of additional swinging arms 102 that pivot about stub shafts 59. Together with the pivoting of the axis of the rotor 51' about the stub shaft 58' by the frame 53', this defines a parallelogram linkage 100, represented by dotted lines in FIGS. 6 and 7, which maintains the housing 48' in the correct orientation to align with the crop flow path in both positions of the accelerator rotor 51'.

Thus, as the frame 53' pivots about stub shafts 58' and the crop processor 41' moves in an arcuate path, the accelerator housing 48' is forced to rotate relative to the frame 53' about its own axis 79' on account of the additional arms 102.

As a consequence of the accelerator housing 48' moving downwards to communicate with the cutter housing, a gap is created between the housing 48' and the lower end of the discharge spout 52'.

In the illustrated preferred embodiment, this gap is filled by a removable section of conduit 104 that is inserted manually between the housing 48' and the spout 52'. The conduit 104 is retained captive between and seals against the housing 48' and the spout 52' to prevent processed crop from escaping.

In practice, the accelerator is lowered past an optimal point, in order to obtain a bigger gap between the exit of accelerator and the intake end of a discharge spout. After the retractable section of conduit is placed in position to bridge this gap, the accelerator is returned to its optimal point, and the retractable section of conduit is held captive in sealed relationship between the accelerator and the discharge spout.

As an alternative, the gap may be closed by a sleeve retracting from either the accelerator housing 48' or the discharge spout 52' or by moving the entire discharge spout 52' downwards to communicate with the accelerator housing 48' in its new position.

What is claimed is:

1. A forage harvester comprising:
    a cutter operable to comminute crop material; and
    a unit arranged downstream of the cutter, the unit including an accelerator having an exit and being arranged in the path of crop flow for propelling the crop towards a discharge spout and a crop processor for cracking kernels, the crop processor being selectively movable into and out of the crop flow path at a location between the cutter and the accelerator, the accelerator comprising a rotor and housing which are together movable towards the cutter when the crop processor is withdrawn from the crop flow path, and wherein a gap is defined between the exit of the accelerator and an intake end of a discharge spout when the accelerator is moved towards the cutter, and wherein a retractable section of conduit is provided to occupy the gap and guide the crop from the accelerator into the discharge spout.

2. A forage harvester as claimed in claim 1, wherein the retractable conduit is entirely removable from the crop flow path.

3. A forage harvester as claimed in claim 2, wherein the retractable conduit, when deployed, is held captive in sealed relationship between the accelerator and the discharge spout.

4. A forage harvester as claimed in claim 1, wherein the housing of the accelerator and the crop processor are supported on a common rigid frame that is pivotable relative to the flow path to allow the crop processor to swing in and out of the flow path of the crop.

5. A forage harvester as claimed in claim 4, wherein the housing of the accelerator is further supported relative to the housing of the harvester by a secondary arm creating a parallelogram linkage so that the orientation of the accelerator housing relative to the cutter and the discharge spout remains constant as the crop processor swings in and out of the flow path of the crop.

6. A method for optimizing the operation of a forage harvester, wherein the forage harvester comprises a cutter operable to comminute crop material and a unit arranged downstream of the cutter, the unit including an accelerator comprising a rotor and a housing arranged in the path of crop flow for propelling the crop towards a discharge spout, and a crop processor for cracking kernels, the crop processor being selectively moveable into and out of the crop flow path at a location between the cutter and the accelerator, the method comprising the steps of:
    moving the accelerator towards the cutter;
    simultaneously withdrawing the crop processor from the crop flow path; and
    filling the formed gap between the exit of the accelerator and an intake end of the discharge spout with a retractable section of conduit.

7. The method according to claim 6, further comprising the steps of:

lowering the accelerator over an optimal point in order to obtain a bigger gap between the exit of accelerator and the intake end of a discharge spout;

filling the formed gap with a retractable section of conduit; and moving the accelerator to its optimal point so the retractable section of conduit is held captive in sealed relationship between the accelerator and the discharge spout.

8. A method for optimizing the operation of a forage harvester, the method comprising the steps of:

providing a forage harvester comprising a cutter operable to comminute crop material and a unit arranged downstream of the cutter, the unit including an accelerator comprising a rotor and a housing arranged in the path of crop flow for propelling the crop towards a discharge spout, and a crop processor for cracking kernels, the crop processor being selectively moveable into and out of the crop flow path at a location between the cutter and the accelerator;

moving the accelerator towards the cutter;

simultaneously withdrawing the crop processor from the crop flow path; and filling the formed gap between the exit of the accelerator and an intake end of the discharge spout with a retractable section of conduit.

\* \* \* \* \*